No. 646,742. Patented Apr. 3, 1900.
A. A. KNUDSON.
ELECTRIC BOND FOR STREET MAINS.
(Application filed Dec. 15, 1899.)
(No Model.)
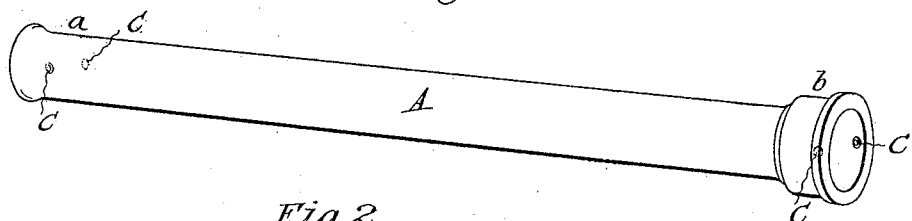
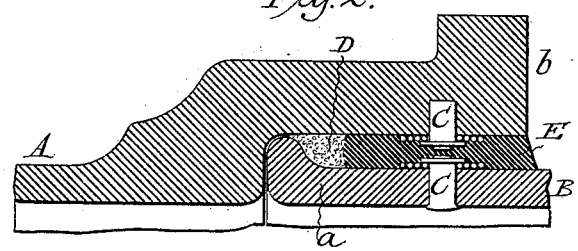
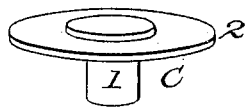
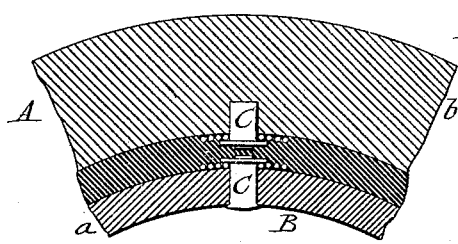
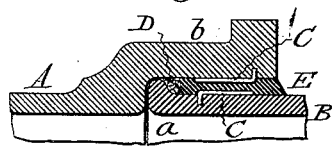
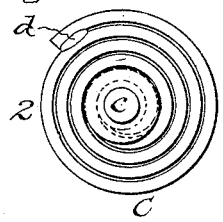
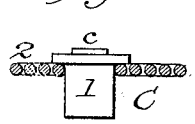
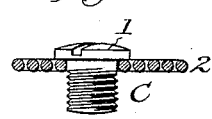
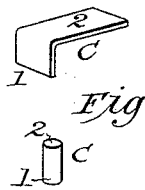
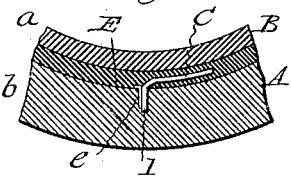
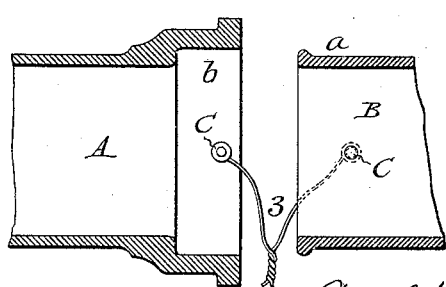
Witnesses
Sidney P. Hollingsworth
E. Thos. Loftus
Inventor
Adolphus A. Knudson
Attorney

UNITED STATES PATENT OFFICE.

ADOLPHUS A. KNUDSON, OF RUTHERFORD, NEW JERSEY.

ELECTRIC BOND FOR STREET-MAINS.

SPECIFICATION forming part of Letters Patent No. 646,742, dated April 3, 1900.

Application filed December 15, 1899. Serial No. 740,444. (No model.)

*To all whom it may concern:*

Be it known that I, ADOLPHUS A. KNUDSON, a citizen of the United States of America, and a resident of Rutherford, in the State of New Jersey, have invented a new and useful Improvement in Electric Bonds for Street-Mains, of which the following is a specification.

It has been discovered that, owing to the high electrical resistance of the joints of water and gas mains laid in the streets of cities, electrical currents, such as escape from railway-tracks, flowing through such mains cause a deflection or shunting of the current around the joints through the damp earth on the outside and through the water in water-mains on the inside. The causes of such joint resistance are, first, the covering of the entire section of pipe, both inside and outside, with an asphaltum varnish to protect it from corrosion, this covering amounting practically to an electrical insulation, especially at the joints, where it is protected against abrasion, and for that reason the high resistance is mostly accounted for, and, second, whatever portions of the iron in the joint which may have become exposed through scraping off the varnish by handling soon oxidizes, especially when in contact with the lead in lead joints, making little or no electrical connection with customary lead packing, through which the current must pass. The effect of such shunting of the current, caused by high resistance in the joints of the mains, is to cause damage by electrolysis to that side of the joint that the current leaves. This is usually shown by indentations or pittings sometimes extending nearly around the pipe, as has been seen in some cases, while in others the pittings are more scattered and extend some distance back from the joint. Where this condition continues for a few years, great damage is caused to the pipes, and it necessitates excavations and repairs, which are very expensive.

The leading object of the present invention is to confine any straying currents which may be passing along the water or gas mains of a city to the pipe itself, or, in other words, to prevent the shunting of such currents around the joints, either inwardly or outwardly, and thus to prevent damage to the pipe by electrolysis.

Another object is to provide a method of electrically bonding pipes that insures a permanent connection and one which cannot be injured or become deteriorated through oxidation or through mechanical injury.

The invention consists in novel means for preventing electrical resistance at such joints and for utilizing the customary lead packing.

A sheet of drawings accompanies this specification as part thereof.

Figure 1 of the drawings is a perspective view of a pipe-section for a street-main having lead joints provided with electric contacts according to this invention. Figs. 2 and 3 are magnified fragmentary sections through the packed joint of a street-main composed of such pipe-sections. Figs. 4 and 5 are respectively a face view and a sectional elevation of one of the contacts on a still larger scale; and Fig. 6 is a sectional elevation, Fig. 7 a perspective view, Fig. 8 a fragmentary section through another packed joint, Figs. 9 and 10 perspective views, Fig. 11 a fragmentary section through another packed joint, and Fig. 12 a fragmentary section through an open joint, illustrating modifications.

Like letters and numbers refer to like parts in all the figures.

From the nature of the invention it will be seen that its application is to be made in part before the pipe is placed in the ground and is completed in the act of "making" or packing the joints.

At the factory where the pipe is made or upon the surface of the ground before the pipe is laid the pipe-sections A and B are each provided at one or both ends, and preferably at both, with one or more non-oxidizable electric contacts C, various forms of which are shown in the drawings.

In laying the protected pipe there is or may be practically nothing for the workmen to do in completing the application thereto of the invention except, if need be, to clean off the contact or contacts C, which may be unmistakably indicated and insured, and then to introduce the jute stuffing D and the lead packing E of a lead joint in customary manner.

The contacts C are located so as to be out of reach of the jute stuffing D and are inclosed and hermetically sealed against deterioration by means of the lead packing E.

The contacts C in common are preferably of tin or of tinned copper because sufficiently inexpensive and at the same time non-oxidizable and adapted to form a perfect electrical contact with iron and with molten lead; but any metal that is a fairly-good conductor of electricity may be used. They are applied in all cases after the pipe has received its asphalt coating, so as not to be covered thereby, and each contact comprises a holding or attaching portion 1 and a protruding portion 2, said attaching portion 1 being tightly fitted to a newly-drilled socket or its equivalent to insure a bright metal contact of the same with the iron of the pipe. The surface adjacent to the socket should also be scraped bright if the protruding portion 2 of the contact is to rest against it.

In the specific embodiment of the invention illustrated by Figs. 1 to 5, inclusive, the spigot end $a$ and the bell $b$ of each of the pipe-sections A and B are provided, respectively, with external and internal contacts C so arranged that they may be brought into coincidence with each other, as in Figs. 2 and 3, and electrically connected with each other by the lead packing E. Two pairs to each pipe-joint are represented; but one pair is considered sufficient in most cases, and in some cases a single contact at each joint may suffice, especially if the opposing surface be scraped bright immediately before pouring the lead. The form of contact represented in these figures comprises a rivet-shaped attaching portion 1, having its head provided with a central boss $c$ to protect the remainder of its surface, which is intended to receive the patent-date, a license-number, or the like. In applying a contact to the spigot end $a$ of a pipe-section the socket to receive such attaching portion 1 is conveniently drilled through, and the attaching portion is then riveted in place, as represented in Figs. 2 and 3. Within the bell $b$ the attaching portion 1 is driven tightly into a drilled socket of sufficient depth. The protruding portion 2 is formed by a normally-flat spiral washer of wire, having the outer coils united by solder, as at $d$, Fig. 4, to preserve the washer shape. A washer of this description is readily conformed by bending to a convex surface and conforms itself to one that is concave and by admitting the lead between its coils affords a large contact area within a small space. The fastenings $d$ of two contacts may, moreover, be readily broken, if desired, in making a joint, and the wires may then be uncoiled and twisted together, as at 3 in Fig. 12, to render the hard-metal connection continuous. Contacts of such description may obviously be used for bonding riveted steel pipes and for other purposes, and their exclusive use is intended to be protected by the claims hereto appended.

In the species represented by Fig. 6 a screw forms the attaching portion 1 of a contact C, the protruding portion 2 of which is a spiral washer, as above described.

In the species represented by Fig. 7 an ordinary rivet forms the attaching portion 1 and a flat annular washer of sheet metal completes the protruding portion 2 of each contact.

In the species represented by Figs. 8 and 9 the contacts C are in the form of L-shaped pieces of sheet metal, with the attaching portions 1 cast fast in the iron of the pipe-sections. A pair of such contacts to each joint is represented in Fig. 8.

A simple plug of tin or other suitable metal may suffice for each of the contacts C, as represented by Fig. 10, the respective ends constituting its attaching portion 1 and its protruding portion 2.

A single contact C, Fig. 11, for each joint to be attached within the bell $b$ and protected thereby may consist of a stiff wire bent immediately beyond its attaching portion 1 so as to conform to the shape of the space for lead and fastened in its socket by a channel-pin $e$.

With a pair of the contacts C to a joint they may be provided with or be adapted to have attached thereto wires 3, Fig. 12, adapted to be twisted together to render the hard-metal connection continuous, as aforesaid. This is done immediately before inserting the spigot $a$ into the bell $b$, and after the jute stuffing D, Fig. 2, is in place the wires are pushed into the bell, so as to be inclosed by the lead packing E in common with the remainder of the contacts. Such wires 3 are preferably provided by opening out the spiral washers 2 of the form of contact first described. Such inclosed continuous connections, Fig. 12, may obviously be employed without the lead packing in other forms of street-main joints, and other like modifications will suggest themselves to those skilled in the art.

Having thus described said improvement, I claim as my invention and desire to patent under this specification—

1. An electric bond for street-mains, electrically connected with the metal of adjoining pipe-sections, and wholly inclosed within the joint between such pipe-sections.

2. An electric bond for street-mains, electrically connected with the metal of adjoining pipe-sections, and hermetically inclosed within a lead joint between such pipe-sections.

3. In an electric bond for street-mains having lead joints, a metallic contact electrically connected with the metal of a pipe-section and in electrical contact with the lead of a joint.

4. In an electric bond for street-mains having lead joints, a metallic contact of tin or metal covered with tin, electrically connected with the metal of a pipe-section and in electrical contact with the lead of a joint.

5. In an electric bond for street-mains having lead joints, a metallic contact comprising an attaching portion electrically connected with the metal of a pipe-section and a protruding portion embedded within the lead of a joint and in electrical contact therewith.

6. In an electric bond for street-mains having lead joints, a metallic contact comprising an attaching portion electrically connected with the metal of a pipe-section and a spiral washer in electrical contact with the lead of a joint.

7. In an electric bond for street-mains having lead joints, a pair of metallic contacts electrically connected respectively with the spigot and bell of a joint and in electrical contact with the lead of such joint.

8. In an electric bond for street-mains, a pair of metallic contacts electrically connected respectively with the adjoining pipe-sections, and comprising spiral washers composed of wires adapted to be uncoiled and electrically connected with each other, the whole inclosed within the joint between such pipe-sections.

ADOLPHUS A. KNUDSON.

Witnesses:
JUSTIN S. GALLAND,
ANDREW FOULDS, Jr.